United States Patent [19]

Rizzie

[11] Patent Number: 4,660,587

[45] Date of Patent: Apr. 28, 1987

[54] SYSTEM FOR PRODUCING UNIFORM VELOCITY DISTRIBUTION OF FLUIDS IN CONDUITS

[76] Inventor: Joseph W. Rizzie, 7704 Beaver Ridge Rd., Knoxville, Tenn. 37931

[21] Appl. No.: 889,867

[22] Filed: Jul. 28, 1986

[51] Int. Cl.$^4$ .............................................. F15D 1/02
[52] U.S. Cl. ......................................... 137/8; 138/37
[58] Field of Search ................. 138/37; 251/118, 127; 137/1, 8

[56] References Cited

U.S. PATENT DOCUMENTS

| | | | |
|---|---|---|---|
| 3,572,391 | 3/1971 | Hirsch | 138/37 X |
| 3,685,355 | 8/1972 | De Baun | 73/861.66 |
| 3,733,900 | 5/1973 | De Baun | 138/37 X |
| 3,748,901 | 7/1973 | De Baun | 73/861.66 |
| 3,840,051 | 10/1974 | Akashi | 138/37 |
| 3,842,678 | 10/1974 | De Baun | 73/863.31 X |
| 3,964,519 | 6/1976 | De Baun | 138/37 |
| 4,208,136 | 6/1980 | King | 138/37 X |

Primary Examiner—Alan Cohan
Attorney, Agent, or Firm—Pitts and Brittian

[57] ABSTRACT

Apparatus for producing uniform velocity distribution of fluids in conduits using a non-homogeneous resistance element. A system is described using a non-homogeneous resistance element together with, in the preferred embodiment, a homogeneous resistance element or a second non-homogeneous resistance element to obtain a uniform velocity distribution of fluids flowing in a conduit. The non-homogeneous resistance element is made up of a plurality of flow channels in the form of a honeycomb, with this honeycomb divided into various regions or zones where flow adjustment is desired in order to achieve the uniform velocity distribution. Specific control within these regions or zones is accomplished by inserting resistance units in the flow channels with the units of highest resistance value being inserted in those regions where the velocity is to be reduced the greatest. The resistance units can be inserted or removed after installation of the elements in a conduit to correct for any non-uniformity of velocity distribution that may occur. Disclosed are preferred methods of fabricating the homogeneous and non-homogeneous resistance elements, and the resistance units.

21 Claims, 9 Drawing Figures

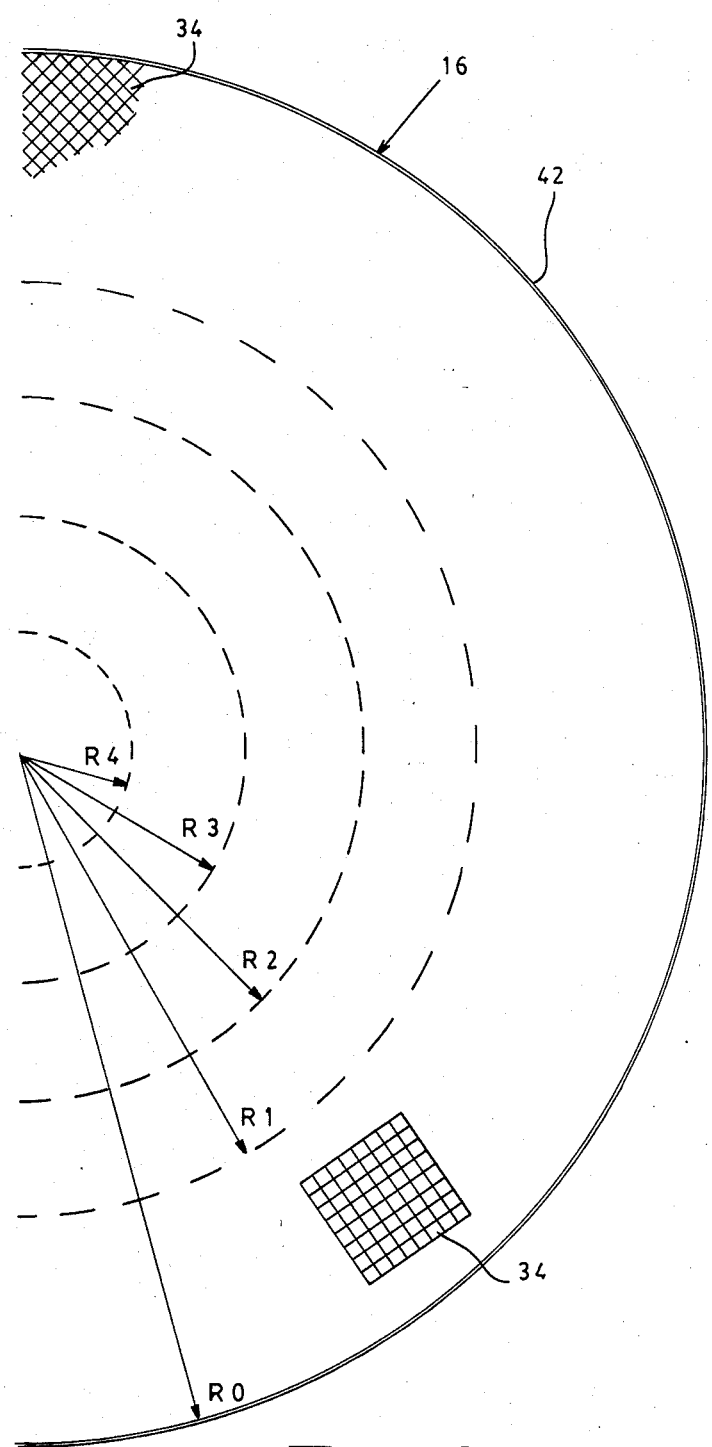
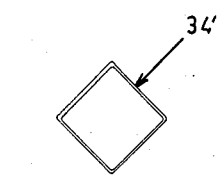
Fig. 5A
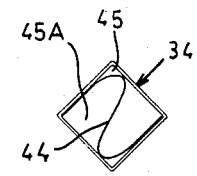
Fig. 5B
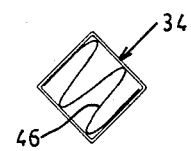
Fig. 5C
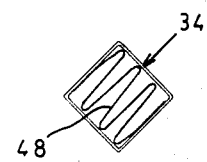
Fig. 5D
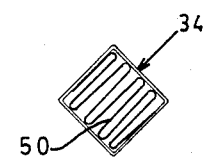
Fig. 5E
Fig. 4

SYSTEM FOR PRODUCING UNIFORM VELOCITY DISTRIBUTION OF FLUIDS IN CONDUITS

TECHNICAL FIELD

This invention relates generally to fluid velocity control in pipes, ducts, and like conduits, and more particularly to a system utilizing a non-homogeneous impedance to produce a uniform velocity distribution of fluids (typically gases) to enhance sampling and velocity determination.

BACKGROUND OF THE INVENTION

Whenever fluids are forced through conduits such as ducts, turbulence occurs because of the nature of circulating equipment and non-uniformity of the conduit itself. Associated with this turbulence is a non-uniformity of the velocity across any selected arbitrary plane in the conduit. Generally the velocity is greater near the center of the conduit; however, physical structures (obstructions, shapes, etc.) of the conduit can shift the region of higher velocities away from the center. The velocity is generally the lowest near the walls of the conduit due, at least in part, to the friction of the fluid along those walls.

The circulation of air in heating, ventilating and air conditioning systems is typical of the fluid systems wherein turbulence and non-uniform velocity distribution occur. In many applications such matters are not detrimental unless excessive resistance to flow occurs or turbulence causes excessive vibration. However, in applications where accurate velocity or volume flows are to be determined, flow in the region of measuring instruments must be laminar and the velocity distribution must be substantially uniform across the conduit (duct).

Numerous apparatus have been utilized to change turbulent flow into laminar flow, and to obtain a uniform velocity profile from a non-uniform profile. One such apparatus for smoothing the velocity distribution is a converging section in the conduit to raise the average velocity; this, however, can have an adverse affect on turbulence. A more conventional apparatus is a homogeneous resistance element interposed across the conduit which results in the smoothing of the velocity distribution. This can be, for example, a "honeycomb" element with passageways of uniform cross-section and length. Such structures are illustrated, for example, in U.S. Pat. Nos. 3,685,355 and 3,748,901, issued to K. W. DeBraun on Aug. 22, 1972, and July 31, 1973, respectively. This type of structure, in addition, straightens the flow to produce laminar flow rather than turbulent flow. Only a moderate amount of smoothing can be achieved with such homogeneous resistance elements so that often several such elements are employed. This, however, causes a loss of energy and can necessitate extra pumping power to achieve a desired velocity.

A non-homogeneous resistance element is shown and described in U.S. Pat. Nos. 3,842,678 and 3,964,519, issued to K. W. DeBraun, et al., on Oct. 22, 1974, and June 22, 1976, respectively. This non-homogeneous resistance element is also a honeycomb structure having passageways of uniform cross-section but varying in length, with the longest passageways in the center where the velocity is the highest. This structure is accomplished by having a contoured surface of the element facing into the flowing fluid, with the downstream side being flat. This unit can be used alone to flatten the velocity profile; but, preferably, it is used with a homogeneous resistance element to further smooth the velocity distribution. Velocity measuring instruments, and samplers if desired, are placed proximate but downstream from these resistance elements.

It will be recognized that for a specific system, the unmodified velocity distribution can be first determined, and then a calculation made as to the dimensions of a non-homogeneous resistance element to achieve a given smoothing of the velocity distribution. An element fabricated using those calculations can be made and installed. If, however, the desired smoothing is not sufficiently accomplished, another unit must be fabricated. Even if the element initially performs adequately, changes in the system (new circulator, changes in the duct configuration, etc.) can adversely affect the performance of the resistance element. Thus, a new unit may be required. Even fouling of the surfaces can adversely affect performance.

Accordingly, it is the principal object of the present invention to provide a non-homogeneous resistance element for achieving uniform velocity distribution of fluids, the element adapted for adjustment of the degree of resistance after installation in a fluid circulating system.

It is another object of the present invention to provide a non-homogeneous resistance element for velocity distribution smoothing having a uniform thickness in a direction of fluid flow.

It is still another object of the present invention to provide a non-homogeneous resistance element for adjusting fluid velocities in a conduit, the element having regions of different resistance to flow with that resistance being selectable in each region by varying the equivalent diameter and length of removable resistors.

It is also an object of the present invention to provide a system for producing uniform velocity distribution of air in air circulating systems, the system including at least one non-homogeneous resistance element to achieve such uniform velocity distribution.

It is a further object to provide a non-homogeneous resistance element to achieve uniform velocity distribution in a fluid circulation system, the resistance element being easily constructed.

These and other objects will become apparent upon a consideration of the following descriptive material when taken together with the drawings.

SUMMARY OF THE INVENTION

In accordance with the various features of the present invention, apparatus is provided for achieving a uniform velocity distribution of fluids in a conduit. The apparatus includes a non-homogeneous resistance element in the conduit that is fabricated of a plurality of channels divided into regions, with replaceable resistor units positioned within at least a portion of the channels according to the regions. The resistor units are selected to adjust the flow of fluid through the channels to achieve a uniform velocity distribution. In a preferred embodiment, the non-homogeneous resistance element is used with a downstream homogeneous resistance element or another non-homogeneous resistance element.

BRIEF DESCRIPTION OF THE DRAWINGS

FIG. 4 is a cross-sectional drawing of a circular non-homogeneous resistance element as shown in FIGS. 1 and 2, illustrating radial regions for the control of fluid flow to achieve a uniform velocity distribution across a cylindrical conduit.

FIGS. 5A-E are cross-sectional drawings illustrating flow passages in each of the radial regions of FIG. 4 showing resistance units typical of those inserted in flow channels of the regions in the non-homogeneous resistance element for achieving a uniform velocity distribution at the output of the element.

BEST MODE OF THE INVENTION

Figure 1:
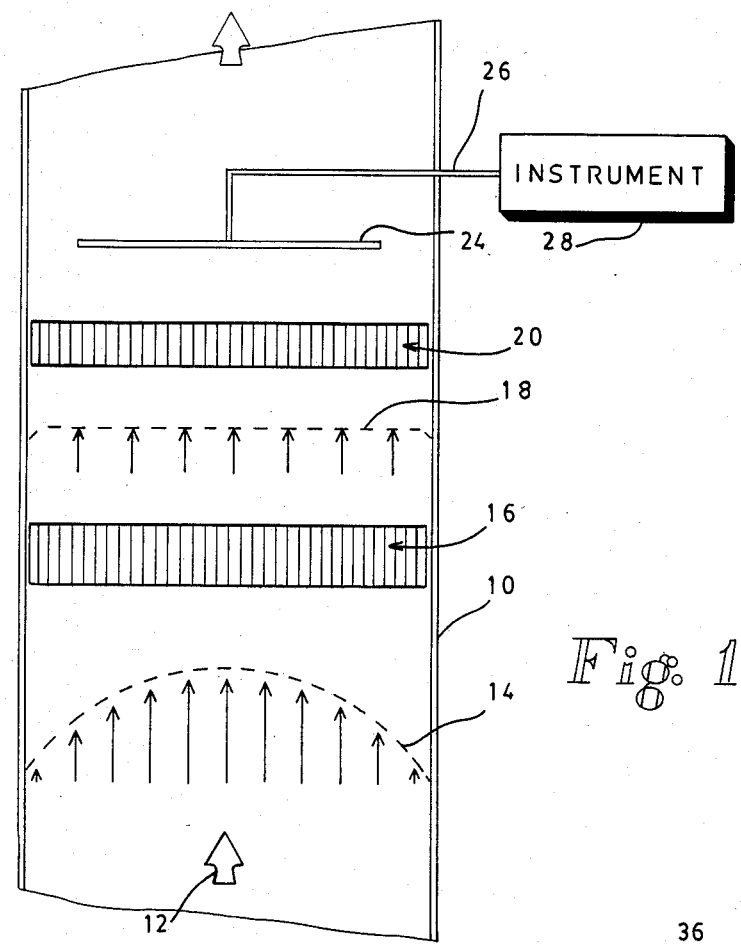
FIG. 1 is a schematic drawing illustrating a fluid flow system employing the present invention wherein a uniform velocity distribution is achieved for velocity monitoring and or sampling of a fluid in a conduit.

Referring now to FIG. 1, shown therein is a typical installation employing the present invention. This particular application will be described relative to achieving uniform velocity distribution of air flowing through a conduit 10. The conduit 10 can have any appropriate cross-section such as being rectangular or circular, and the present invention is not to be limited to any particular configuration. Air is caused to flow through the conduit 10 in the direction indicated by the arrow 12 by any suitable air circulating means (not shown). The air will have a velocity distribution across a conduit 10 of the general configuration shown by the dashed line 14. Interposed in the air flow is a non-homogeneous resistance element 16 of the type described in detail hereinafter, which results in a substantially uniform velocity distribution as indicated by the dashed line 18. For most applications, a homogeneous resistance element 20 (or a second non-homogeneous resistance element) is utilized to assist in straightening the flow of air in the conduit 10 and further provide for uniform velocity distribution. An array of velocity measuring elements and/or samplers is indicated generally at 24 with a conduit 26 therefrom leading to appropriate instrumentation 28 for the measuring of velocity, mass flow and/or the constituents within a sample of air drawn from the conduit 10. It is to be understood, however, that use of the present invention is not limited to systems utilizing samplers, etc.

Figure 2:
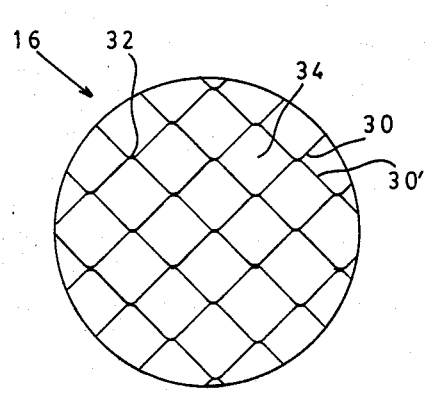
FIG. 2 is a cross-sectional drawing illustrating a representative portion of the non-homogeneous resistance element utilized in the system of FIG. 1.
Figure 3:
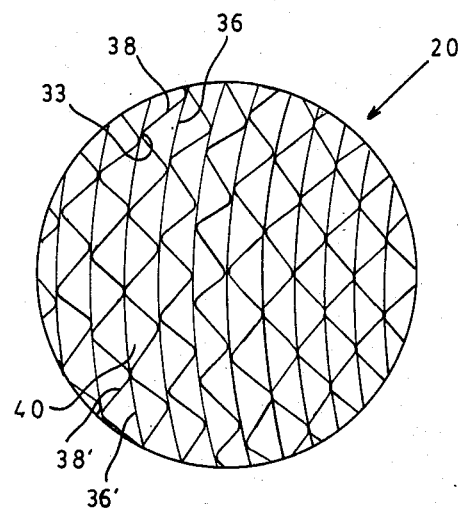
FIG. 3 is a cross-sectional drawing illustrating a representative portion of one embodiment of the homogeneous resistance element utilized in the system of FIG. 1.

Typical cross-sections of the non-homogeneous resistance element 16 and the homogeneous resistance element 20 of FIG. 1 are indicated in FIGS. 2 and 3, respectively. Referring first to FIG. 2, the structure of the non-homogeneous resistance element 16 is fabricated using a plurality of corrugated panels as indicated at 30, 30'. These panels are arranged such that the ridges of the panels are in contact, and they are joined along these ridges as with spot welding at the juncture 32. As a result, a type of honeycomb cell structure is formed having passageways 34 through the thickness of the element. In this particular embodiment, the passageways are substantially square in cross-section. However, other configurations can be utilized. This square cross-section is the preferred embodiment as will be discussed with regard to FIGS. 4 and 5. Typically, these passageways are approximately one-half inch on each edge of the square. If a second non-homogeneous resistance element is utilized, the construction thereof would be the same. Although the element of FIG. 2 is configured for a duct of circular cross-section, other perimeter configurations are within the scope of the invention.

Referring now to FIG. 3, a cross-section of a typical embodiment for the homogeneous resistance element 20 is illustrated. The particular configuration is that for a element of circular configuration for use in a cylindrical conduit. Although other internal configurations can be used, the preferred embodiment illustrated in FIG. 3 utilizes a singular continuous panel 36 to which is attached a continuous corrugated panel 38. These two panels are wound together on a mandrel which becomes the center of the resistance element with the two panels being joined, as with spot welding, wherever the ridges of the corrugated member contact the flat member. Thus, the flat member 36' and the corrugated member 38' are the convolution layer immediately adjacent the layers 36 and 38. When wound and joined in this fashion, substantially triangular passageways 40 are produced.

It is to understood that the corrugated or crimped panels used in both the structure of FIG. 2 and that of FIG. 3 (as well as the resistance units of FIG. 5) can be identical such that a single forming step can be utilized to produce this material. This substantially simplifies fabrication steps for these elements. Typically the material used for fabrication is stainless steel, and the sheets typically have a thickness of 0.005 inch. Both of the resistance elements (non-homogeneous and homogeneous) typically have a thickness (in the direction of air flow) of 4.0 inches.

More detail of the non-homogeneous resistance element 16 is shown in FIG. 4 which illustrates one-half of the area of a circular embodiment of the element. It can be seen that this element is bounded by the frame 42. This frame typically would be provided with brackets or other fasteners (not shown) to attach the element to the interior of a conduit. The corrugated members (see FIG. 2) are secured to the interior surface of the frame to form the aforementioned passageways 34. This resistance element is divided into a plurality of regions or zones (five in this embodiment) which are defined in this figure as existing at various radii of the unit. This is for the case where the velocity is highest in the center of the duct and decreases radially. The major radius (R0) is the total radius of the resistance element. The number of regions or zones, and their spacing, are selected such that flow in these regions or zones can be controlled in order to establish the uniform velocity distribution of fluids exiting from this non-homogeneous resistance element.

The zones do not necessarily have a radial position such as illustrated in FIG. 4. The arrangement of the zones is chosen such that the air flow is adjusted to produce a uniform velocity distribution from whatever is the initial distribution. In some applications, for example, relatively high velocity may exist in a non-central location and thus the zones are adjusted accordingly.

Depending upon the particular initial velocity distribution (as indicated at 14 in FIG. 1), the resistance to flow in each region is adjusted by an appropriate resistor unit of the types indicated in FIG. 5. For example, with relationship to FIG. 4, the region between R1 and R0 (indicated by the flow channel 34 in FIG. 5A) would contain no resistor unit, and therefore the only adjusting of the velocity distribution in this region would be that produced by the passageways 34 themselves. In the next inner region between the radii R1 and R2 a resistor unit 44, such as indicated in FIG. 5B, would be inserted creating secondary passageways as at 45, 45A, thus giving more resistance to flow and therefore modifying the velocity distribution at the outlet from that portion of the unit. In a like manner the other three regions, if such are utilized, would contain resistor units 46, 48, 50 (FIGS. 5C, 5C, and 5E) that provide increasing resistance to flow to further linearize the velocity distribution at the output.

The variable resistor elements are used to vary the pressure drop across a flow channel (duct) by adjusting the equivalent diameter (D) and length (L). The L/D ratio of the resistor unit is proportional to the change in pressure across each individual cell. It is known by persons versed in the art that the change in pressure across a cell is expressed by Darcy's formula:

$$\Delta P = \rho f L v^2 / 144 \, D^2 g,$$

where

L is the length of the resistor in feet;
D is the equivalent diameter of the resistor in feet;
v is the mean velocity of flow in feet per second;
f is the friction factor;
$\rho$ is the weight density of fluid in pounds per cubic feet;
g is the acceleration of gravity; and
$\Delta P$ is the delta pressure in pounds per square feet.

Thus, chanaging the L/D ratio results in a change in pressure across the resistance element forcing a change in velocity across the element as required by the known Bernoulli theorem.

The specific resistive units illustrated in FIG. 5 are typically fabricated of portions of the aforementioned corrugated metal (as used to fabricate the resistance elements) cut in lengths to provide the desired number of folds. These units, after further crimping, are inserted into appropriate of the channels 34 and, as such, are replacable to provide any necessasry fine tuning of the velocity distribution. When the proper velocity distribution has been achieved, the resistance units can be crimped into place or spot welded, if desired. In this manner, should the flow distribution change for any reason, adjustment can be made by interchanging some of the resistance units to again achieve desired uniform velocity distribution. The resistance units can be removed for cleaning or replacement if their surfaces become excessively fouled. In FIG. 5 the exterior square structure depicts the substantially square channels as described with regard to FIG. 2, and the generally sinusoidal line (44, 46, 48, 50) within the box represents the configuration of the resistance units. It will be understood that these resistance units can have other configurations to effect the change in the L/D ratio such that the flow through the channels in each of the regions or zones is appropriately affected to achieve the desired exit velocity distribution.

The non-homogeneous resistance element illustrated in FIGS. 1, 2, and 4 is indicated as having a uniform thickness. This is in contrast to the non-homogeneous unit of the prior art, and facilitates fabrication of the unit. The principal value, however, is in the ability to adjust the resistance to flow in regions, or portions of regions, to accomplish the desired velocity distribution. This can be accomplished even after the basic core structure has been installed in a fluid circulating system. Further adjustment can be made when the initial velocity distribution is altered by a replacement of fluid circulator, a change in the configuration of the conduit or duct, or other changes in physical variables of the system that tend to alter the velocity distribution.

The initial design of a non-homogeneous resistance element first involves the determination of the approximate velocity distribution that is created by the circulating system. Depending upon the degree of non-uniformity, the position and number of regions or zones can be determined, as well as the amount of resistance for each zone. Since the basic honeycomb structure is the same for all installations of a given size, specific resistance units are fabricated and inserted in the appropriate regions or zones in order to achieve the desired velocity distribution.

As stated above, the non-homogeneous resistance element is normally utilized in conjunction with a second resistance element which can be a homogeneous resistance element. This homogeneous resistance element further reduces any turbulence in the air flowing through the conduit, and provides some flattening of the velocity distribution. As stated above, a second non-homogeneous resistance element can be used in place of a homogeneous element. Through the use of these two elements, the output velocity distribution is substantially uniform such that velocities measured at any position across the conduit are substantially identical. Thus, any sampling that occurs throughout the conduit is taken at a substantially constant velocity, and the sample is thus homogeneous. These characteristics are necessary when very close control is required for determining pollutants in the air being circulated in industrial systems, for example.

From the foregoing, it will be understood by those versed in the art that a system has been described for the production of a uniform velocity distribution of a fluid flowing through a conduit. This system is applicable to both liquids and gases, and is particularly useful in air handling systems. Furthermore, it is applicable to conduits or ducts of a variety of cross-sections with the resistance elements being fabricated to match the cross-section of the conduit or duct. Symmetrical or assymetrical velocity distributions can be adjusted to uniform velocity distributions.

Although only specific embodiments of the present invention have been shown and described, it is not intended to limit the invention by such embodiments. Accordingly, the scope of the invention is to be defined by the appended claims and their equivalents.

I claim:

1. A non-homogeneous resistance element for use in a conduit to produce a uniform velocity distribution of a fluid flowing through such conduit, which comprises:

a core element defining an upstream and a downstream surface, said core element provided with a plurality of cells having cell walls defining passageways of a selected size and configuration extending between said upstream and downstream surfaces; and replaceable resistance units inserted into selected of said passageways, said resistance units having a selected resistance to flow of such fluid, said selected resistance varying between said passageways and being of a value to achieve such uniform velocity distribution of such fluid at said downstream surface of said core element.

2. The non-homogeneous resistance element of claim 1 wherein said resistance units are releasably secured in said passageways.

3. The non-homogeneous resistance element of claim 1 wherein said passageways are of a uniform length and a uniform cross-sectional configuration.

4. The non-homogeneous resistance element of claim 3 wherein said cross-sectional configuration of said passageways is substantially a square.

5. The non-homogeneous resistance element of claim 4 wherein said cells are produced by layering corrugated sheets having crimps of substantially ninety degrees, with ridges of each of said corrugated sheets in contact with and attached to ridges of an adjoining corrugated sheet.

6. The non-homogeneous resistance element of claim 5 wherein said resistance units are fabricated from selected lengths of said corrugated sheets, with corrugations of said sheets further crimped to produce secondary passageways when installed within said passageways and thereby produce said selected value of resistance to flow within said passageways in said zones.

7. Apparatus for producing a uniform velocity distribution of a fluid flowing in a conduit from a non-uniform velocity distribution flow, which comprises:
a non-homogeneous resistance element interposed within such conduit to accept such non-uniform velocity flow, said non-homogeneous resistance element fabricated from a core element defining an upstream and a downstream surface and provided with a plurality of cells having cell walls defining passageways of a selected uniform size and configuration extending from said upstream surface to said downstream surface, said core element defining zones of said passageways, selected of said passageways having replaceable resistance units inserted therein having a selected resistance to flow of such fluid, said selected resistance varying between said zones to achieve such uniform velocity distribution of such fluid at said downstream surface of said core element; and
a second resistance element interposed within such conduit to accept flow from said non-homogeneous element to provide further adjustment of such flow of such fluid within such conduit.

8. The apparatus of claim 7 wherein said second resistance element is a homogeneous element comprises a second core element defining an upstream and a downstream surface, said second core element provided with a plurality of cell walls defining uniform passageways of a selected size and configuration extending between said upstream and said downstream surface.

9. The apparatus of claim 8 wherein said homogeneous resistance element is provided with substantially triangular passageways formed by interleaving a flat sheet and a corrugated sheet, spirally winding said sheets on a mandrel, and joining ridges of said corrugated sheet to said flat sheet during winding.

10. The apparatus of claim 7 wherein said second resistance element is a second non-homogeneous resistance element, said second non-homogeneous resistance element fabricated from a core element defining an upstream and downstream surface and provided with a plurality of cells having cell walls defining passageways of a selected uniform size and configuration extending from said upstream surface to said downstream surface, said core element defining zones of said passageways, selected of said passageways having replaceable resistance units inserted therein having a selected resistance to flow of such fluid, said selected resistance varying between said zones to achieve such uniform velocity distribution of such fluid at said downstream surface of said core element of said second non-homogeneous resistance element.

11. The apparatus of claim 10 wherein said cells of said second non-homogeneous resistance element are produced by layering corrugated sheets having crimps of substantially ninety degrees, with ridges of said corrugated sheets in contact with and attached to ridges of an adjoining corrugated sheet.

12. The apparatus of claim 7 wherein said passageways of said non-homogeneous resistance element are uniform in length, and said cross-sectional configuration is substantially a square.

13. The apparatus of claim 7 wherein said passageways of said non-homogeneous resistance element are produced by layering corrugated sheets having crimps of substantially ninety degrees, with ridges of each of said corrugated sheets in contact with and attached to ridges of an adjoining corrugated sheet.

14. The apparatus of claim 7 wherein said resistance units in passageways of said non-homogeneous resistance element are releasably secured in said passageways.

15. The apparatus of claim 13 wherein said resistance units are fabricated from selected lengths of said corrugated sheets, with corrugations of said sheets being further crimped to produce secondary passageways when installed within said passageways and thereby produce said varying value of resistance to flow within said passageways in said zones.

16. The apparatus of claim 12 wherein said passageways of said non-homogeneous resistance element are about four inches in length, and about one-half inch on a side of said square configuration, and said resistance units extend from said upstream surface to said downstream surface of said core.

17. The apparatus of claim 7 wherein such conduit is circular in cross-section, said non-homogeneous and said second resistance elements are circular in cross-section, said non-homogeneous resistance element defines five radial zones, said resistance units are positioned within four inner zones with said varying resistance value decreasing radially outwardly according to said zones.

18. The apparatus of claim 17 wherein said resistance value in a central zone is provided by a resistance unit forming ten secondary passageways, said resistance value in a second zone adjacent said central zone is provided by a resistance unit forming eight secondary passageways, said resistance value in a third zone adjacent said second zone is provided by a resistance unit forming six secondary passageways, and said resistance value in a fourth zone adjacent said third zone is provided by a resistive unit forming four secondary passageways.

19. Apparatus for producing a uniform velocity distribution of a fluid flowing in a conduit from a non-uniform velocity distribution, which comprises:
a non-homogeneous resistance element interposed within such conduit to accept such non-uniform velocity flow, said non-homogeneous resistance element fabricated from, a core element defining substantially parallel upstream and downstream surfaces, said core element produced by layering corrugated sheets having crimps of substantially ninety degrees with ridges of each corrugated sheet being in contact with and attached to ridges of an adjoining corrugated sheet to define a plurality of passageways having a substantially square cross-section extending between said upstream and downstream surfaces, said core element defining zones of passageways, said core element having a border frame with extremities of said corrugated sheets attached thereto, and replaceable resistance units inserted in, and extending the length of, selected of said passageways, each of said resistance units fabricated from selected lengths of corrugated sheets, with corrugations of said sheets being further crimped to produce secondary passageways when inserted in said passageways of said core element, each of said resistance units thereby having a selected resistance to flow of such liquid, said selected resistance varying between said zones to achieve such uniform velocity distribution of such fluid at said downstream surface of said core element; and a homogeneous resistance element interposed within such conduit proximate said downstream surface of said non-homogeneous resistance element, said homogeneous resistance element fabricated by interleaving a flat sheet and a corrugated sheet, and joining ridges of said corrugated sheet to said flat sheet during winding to define substantially triangular passageways extending between an upstream and a downstream surface of said homogeneous resistance element.

20. The apparatus of claim 19 wherein such conduit is circular in cross-section, said non-homogeneous and said homogeneous resistance are circular in cross-section, said non-homogeneous resistance element defines radial zones, and said resistance units are positioned within said radial zones with said selected resistance of said resistance unit varying between said radial zones.

21. A method for producing a uniform velocity distribution of a fluid flowing through a conduit, which comprises:

mounting a non-homogeneous resistance element within such conduit, said non-homogeneous having a core defining an upstream surface and a downstream surface, said core element having a uniform thickness between said upstream and downstream surfaces, said core element provided with a plurality of cells having cell walls defining uniform passageways of a selected size and configuration throughout said core element, said core element defining zones of said passageways; and inserting replaceable resistance units into selected of said passageways, said resistance units having a selected resistance to flow of such fluid, said selected resistance varying between said passageways and being of a value to achieve such uniform velocity distribution at said downstream surface of said core element.

* * * * *